United States Patent
Ferrara et al.

(10) Patent No.: US 11,138,319 B2
(45) Date of Patent: Oct. 5, 2021

(54) LIGHT-WEIGHT CONTEXT TRACKING AND REPAIR FOR PREVENTING INTEGRITY AND CONFIDENTIALITY VIOLATIONS

(71) Applicant: International Business Machines Corporation, Armonk, NY (US)

(72) Inventors: Pietro Ferrara, Verona (IT); Marco Pistoia, Amawalk, NY (US); Omer Tripp, San Jose, CA (US); Petar Tsankov, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 15/793,317

(22) Filed: Oct. 25, 2017

(65) Prior Publication Data
US 2019/0121987 A1    Apr. 25, 2019

(51) Int. Cl.
*G06F 21/60* (2013.01)
*G06F 21/62* (2013.01)
(Continued)

(52) U.S. Cl.
CPC ............ *G06F 21/602* (2013.01); *G06F 21/16* (2013.01); *G06F 21/62* (2013.01);
(Continued)

(58) Field of Classification Search
CPC ..... G06F 21/602; G06F 21/62; H04L 9/0618; H04L 9/0643; H04L 9/08; H04L 9/32; H04L 2209/60; H04L 2209/80
See application file for complete search history.

(56) References Cited

U.S. PATENT DOCUMENTS

| 10,025,952 B1* | 7/2018 | Wang .................. G06F 21/6245 |
| 2009/0300751 A1* | 12/2009 | Krishnamurthy ... H04L 63/0227 726/13 |

(Continued)

OTHER PUBLICATIONS

IBM, "Description, Enforcement and Presentation of Privacy Policies based on Contextual Integrity", Jul. 21, 2005.

(Continued)

*Primary Examiner* — Eleni A Shiferaw
*Assistant Examiner* — Bassam A Noaman
(74) *Attorney, Agent, or Firm* — Harrington & Smith (57) ABSTRACT

A computer system performs tracking of security context for confidential or untrusted values input from sources in an executing application to sinks in the executing application. The security context includes indications of sources and declassifier methods corresponding to the values and has been previously defined prior to the tracking. Prior to release of a selected confidential or untrusted value by a sink in the executing application, security context is fetched for the selected confidential or untrusted value. A selected declassifier method is caused to be used on the selected confidential or untrusted value prior to release of the selected confidential or untrusted value to the sink. The selected declassifier method obfuscates the selected confidential or untrusted value and is selected based on the security context for the selected confidential or untrusted value. The obfuscated confidential or untrusted value is caused to be released to the sink in the executing application.

19 Claims, 6 Drawing Sheets

(51) Int. Cl.
- *H04L 9/32* (2006.01)
- *H04L 9/08* (2006.01)
- *G06F 21/16* (2013.01)
- *H04L 9/06* (2006.01)

(52) U.S. Cl.
CPC ........ *G06F 21/6245* (2013.01); *H04L 9/0618* (2013.01); *H04L 9/0643* (2013.01); *H04L 9/08* (2013.01); *H04L 9/32* (2013.01); *H04L 2209/60* (2013.01); *H04L 2209/80* (2013.01)

(56) References Cited

U.S. PATENT DOCUMENTS

| | | |
|---|---|---|
| 2010/0042824 A1 | 2/2010 | Lee et al. |
| 2011/0209193 A1 | 8/2011 | Kennedy |
| 2012/0216177 A1* | 8/2012 | Fink ............ G06F 8/77 717/131 |
| 2013/0291055 A1 | 10/2013 | Muppidi et al. |
| 2015/0058997 A1 | 2/2015 | Lee et al. |
| 2015/0161393 A1* | 6/2015 | Pistoia ............ G06F 21/577 726/25 |
| 2016/0232346 A1* | 8/2016 | Paddon ............ G06F 21/552 |
| 2016/0246992 A1* | 8/2016 | Brutschy ............ G06F 21/6245 |
| 2018/0053003 A1* | 2/2018 | Nair ............ G06F 3/1454 |
| 2019/0050600 A1* | 2/2019 | Sahoo ............ G06F 21/6281 |

OTHER PUBLICATIONS

Internet Society Requests for Comment, (RFCs) S. Kent, A. Chi, "Threat Model for BGP Path Security (RFC7132)", Feb. 1, 2014.

W. Enck, P. Gilbert, Byung-Gon Chun, "TaintDroid: An Information-Flow Tracking System for Realtime Privacy Monitoring on Smartphones", Proceedings of the 9th USENIX conference on Operating systems design and implementation, Article No. 1-6, 2010.

OWASP Mobile Security Project—OWASP, from https://www.owasp.org/index.php/OWASP_Mobile_Security_Project#tab=Top_10_Mobile_Risks, downloaded on Mar. 3, 2016.

OWASP Mobile Security Project, Mobile Top 10 2014-M4, from https://www.owasp.org/index.php/Mobile_Top_10_2014-M4, downloaded on Mar. 8, 2016.

P. Hornysack et al., "These Aren't the Droids You're Looking for": Retrofitting Android to Protect Data from Imperious Applications, CCS'11 , Oct. 17-21, 2011, Chicago, Illinois, USA.

Omer Tripp and Julie Rubin, "A Bayesian Approach to Privacy Enforcement in Smartphones", SEC'14 Proceedings of the 23rd USENIX conference on Security Symposium, pp. 175-190 (2014).

* cited by examiner

```
230-1 ──── String country = LocationManager.getCountry();   ← 210-1
230-2 ──── String deviceId = DeviceManager.getDeviceId();   ← 210-2
230-3 ──── sendData (country);   ← 220-1
230-4 ──── sendData (deviceId);  ← 220-2
```
280-1, 280-2
200-1

FIG. 2B

```
230-1 ──── String country = LocationManager.getCountry();      ← 210-1
230-2 ──── String deviceId = DeviceManager.getDeviceId();      ← 210-2
230-5 ──── country = obfuscateCountry (country);               ← 240-1
230-3 ──── sendData (country);                                 ← 220-1
230-6 ──── deviceId = obfuscateDeviceId (deviceId);            ← 240-2
230-4 ──── sendData (deviceId);                                ← 220-2
```
280-1, 280-2
200-2

LIGHT-WEIGHT CONTEXT TRACKING AND REPAIR FOR PREVENTING INTEGRITY AND CONFIDENTIALITY VIOLATIONS

BACKGROUND

The present invention relates to computer systems, e.g., wireless, mobile systems, that communicate over networks, and more particularly to integrity and confidentiality on those computer systems.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Security vulnerabilities in applications such as mobile applications are prevalent. For instance, the Open Web Application Security Project (OWASP), which is a not-for-profit charitable organization focused on improving the security of software, has been listing the top 10 vulnerabilities in mobile applications for several years. These vulnerabilities include unintended data leakage, which the OWASP rates as an easy exploitation with possible severe technical impacts and important business impacts.

As mobile users become more and more aware that mobile devices release confidential data to unauthorized entities, the demand for automatically preventing confidential data leaks becomes more pressing. For example, today's mobile users are aware that many of the top popular applications leak confidential data (e.g., the user's location or the device's unique identifiers) to advertising and analytics servers. Many users do not however approve the sharing of this information with servers other than the application's backend.

It would therefore be beneficial to reduce the possibility of release of confidential data to unauthorized entities for applications for use, e.g., on mobile devices and other computer systems.

SUMMARY

This section is intended to include examples and is not intended to be limiting.

In an exemplary embodiment, a method comprises tracking, by a computer system, security context for confidential or untrusted values input from sources in an executing application to sinks in the executing application. The security context comprises at least indications of sources and declassifier methods corresponding to the values and has been previously defined prior to the tracking. The method also comprises fetching, by the computer system and prior to release of a selected confidential or untrusted value by a sink in the executing application, security context for the selected confidential or untrusted value. The methods additionally comprises causing by the computer system a selected declassifier method to be used on the selected confidential or untrusted value prior to release of the selected confidential or untrusted value to the sink. The selected declassifier method obfuscates the selected confidential or untrusted value and is selected based on the security context for the selected confidential or untrusted value. The method additionally comprises causing by the computer system the obfuscated confidential or untrusted value to be released to the sink in the executing application.

Another exemplary embodiment is a computer system. The computer system comprises memory storing computer-readable code and one or more processors. The one or more processors cause the computer system, in response to retrieval and execution of the computer-readable code, to perform operations comprising: tracking, by a computer system, security context for confidential or untrusted values input from sources in an executing application to sinks in the executing application, wherein the security context comprises at least indications of sources and declassifier methods corresponding to the values and has been previously defined prior to the tracking; fetching, by the computer system and prior to release of a selected confidential or untrusted value by a sink in the executing application, security context for the selected confidential or untrusted value; causing by the computer system a selected declassifier method to be used on the selected confidential or untrusted value prior to release of the selected confidential or untrusted value to the sink, wherein the selected declassifier method obfuscated the selected confidential or untrusted value and is selected based on the security context for the selected confidential or untrusted value; and causing by the computer system the obfuscated confidential or untrusted value to be released to the sink in the executing application.

A further exemplary embodiment is a computer program product. The computer program product comprises a computer readable storage medium having program instructions embodied therewith, the program instructions executable by a computer system to cause the computer system to perform operations comprising: tracking, by a computer system, security context for confidential or untrusted values input from sources in an executing application to sinks in the executing application, wherein the security context comprises at least indications of sources and declassifier methods corresponding to the values and has been previously defined prior to the tracking; fetching, by the computer system and prior to release of a selected confidential or untrusted value by a sink in the executing application, security context for the selected confidential or untrusted value; causing by the computer system a selected declassifier method to be used on the selected confidential or untrusted value prior to release of the selected confidential or untrusted value to the sink, wherein the selected declassifier method obfuscated the selected confidential or untrusted value and is selected based on the security context for the selected confidential or untrusted value; and causing by the computer system the obfuscated confidential or untrusted value to be released to the sink in the executing application.

BRIEF DESCRIPTION OF THE SEVERAL VIEWS OF THE DRAWINGS

FIG. 3A illustrates traditional dynamic tracking of taint, while FIG. 4, which includes FIGS. 4A and 4B, is a logic flow diagram for light-weight context tracking and repair, and illustrates the operation of an exemplary method, a result of execution of computer program instructions embodied on a computer readable memory, functions performed by logic implemented in hardware, and/or interconnected means for performing functions in accordance with exemplary embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As stated above, it is a problem that computer systems such as mobile devices may release confidential data to unauthorized entities. Additional description concerning this issue and exemplary embodiments to improve this situation are presented after an exemplary and non-limiting system is introduced in reference to FIG. 1.

Figure 1:
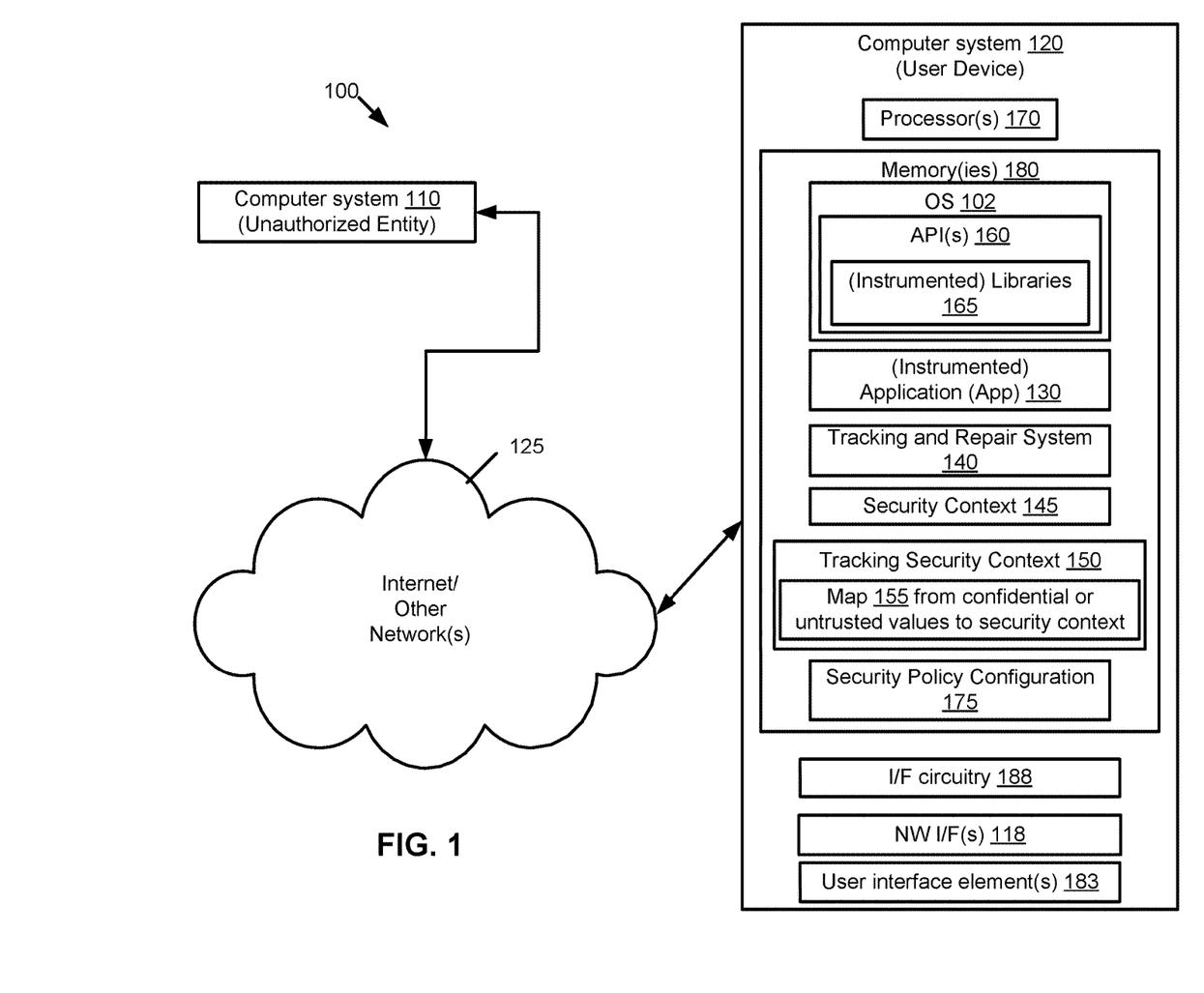
FIG. 1 illustrates an exemplary system used for light-weight context tracking and repair in an exemplary embodiment.

Turning to FIG. 1, this figure illustrates an exemplary system 100 used for light-weight context tracking and repair for preventing integrity and confidentiality violations. FIG. 1 illustrates one possible example and there are many others. The system 100 comprises the computer systems 110 and 120, which communicate in part via the network(s) 125. The computer system 110 is an unauthorized entity that receives confidential information released by the computer system 120, and particularly the application (also referred to as an "app") 130. The computer system 110 will also be referred to as the unauthorized entity 110. The computer system 120 is mainly assumed to be a wireless and mobile user device, which a user uses to access and use the application 130, although the computer system could be other devices such as a personal computer. A user is a human being that uses the user device. The computer system 120 is also referred to as the user device 120. The primary emphasis herein is placed on wireless mobile devices, but the techniques provided herein can be used on applications for user devices that are not mobile, such as devices in the Internet of Things, home computers, networked computers, and the like. The techniques herein can be applied to any computer system that can release confidential data from a user.

The computer system 120 comprises one or multiple processors 170, one or more multiple memories 180, interface circuitry 188, one or more network (N/W) interfaces (I/F(s)) 118, and one or more user interface elements 183. The user device 120 may include or be connected to the one or more user interface elements 183. The one or more memories 180 may comprise some or all of an operating system (OS) 102, an (instrumented) application 130, a tracking and repair system 140, defined security context 145, tracking security context 150, and security policy configuration 175. The security policy configuration 175 comprises security policies, specified as an entity separate from the program or the instrumentation. The OS 102 includes one or more API(s) 160, which include (instrumented) libraries 165. The tracking security content 150 includes a map 155 from confidential or untrusted values to corresponding security context. The tracking and repair system 140 comprises computer readable code that, when executed by the one or more processors 170, causes the computer system 120 to perform the techniques provided herein. The elements 140, 145, 150, and 155 are described in more detail below. The OS 102 is a collection of software that directs a computer's operations, controlling and scheduling the execution of other programs, and managing storage, input/output, and communication resources. The application 130 is an application that is typically installed by the user from an "app store", although the application would also be installed by the device's manufacturer or the like. Although only one application 130 is shown, this is merely for ease of reference and typically many such applications are installed.

The user interface element(s) 183 of the user device 120 could be one or more of, e.g., a touch screen, wireless keyboard, motion sensors, mice, trackballs, and the like. In the example of a mobile, wireless user device 120, the user interface elements 183 would typically include a touch screen.

The network 125 could be or include a local area network (LAN), a wide area network (WAN), the Internet, or the "cloud". The network 125 could also include a cellular network. Typically, a combination of networks is used, such as a cellular network (or Wi-Fi network) to the Internet.

The computer readable memory/memories 180 may be of any type suitable to the local technical environment and may be implemented using any suitable data storage technology, such as semiconductor based memory devices, flash memory, magnetic memory devices and systems, optical memory devices and systems, fixed memory and removable memory, or some combination of these. The computer readable memory/memories 180 may be means for performing storage functions. The processor(s) 170 may be of any type suitable to the local technical environment, and may include one or more of general purpose processors, special purpose processors, microprocessors, gate arrays, programmable logic devices, digital signal processors (DSPs) and processors based on a multi-core processor architecture, or combinations of these, as non-limiting examples. The processor(s) 170 may be means for performing functions, such as controlling the computer system 120, respectively, and other functions as described herein. The network interface(s) 118 may be wired and/or wireless and communicate over the Internet/other network(s) 125 via any communication technique.

As described previously, computer systems such as mobile devices may release confidential data to unauthorized entities. The techniques herein teach how to prevent integrity and confidentiality violations, but for explanatory purposes, the instant disclosure focuses on confidentiality vulnerabilities only.

A very important requirement for any system for automatic prevention of confidentiality data leaks is that the system must correctly repair the data leaks without affecting the application's functionality. For example, a system that causes an application to crash as the result of repairing a confidentiality data leak is unlikely to be adopted by users such as mobile users. In the example of FIG. 1, the tracking and repair system 140 is the entity that performs tracking of user information from sources (input points for the information, from outside the application) to sinks (the output points for the information, to locations outside the application). The tracking and repair system 140 also will repair the confidentiality (or integrity), e.g., by obfuscating the user information.

To correctly prevent confidentiality data leaks, i.e., without causing any side-effects other than repairing the confidentiality data leaks, the automated repair system (e.g., tracking and repair system 140) may track a significant amount of contextual information (referred to as security context herein). Examples of contextual information, which may be indicated by the security context 145, include the following:

(1) Source API (application programming interface)—the API method used to obtain the confidential data (e.g., the LocationManager.getLastKnownLocation( ) API method in Android);

(2) Transformations history—the sequence of transformations applied to the confidential data (e.g., encryption algorithms, hash algorithms, encoding functions, etc.); and (3) Transformation values—values used when transforming the confidential data (e.g., encryption keys, initialization vectors, etc.).

Note that (1) may also use fields as the sources or both fields and the API methods. In Javascript (a programming language to dynamically script webpages), for instance, fields are sources and are potential problems if the data from the fields travels to a sink without uses of an appropriate declassifier method.

Figure 2A:
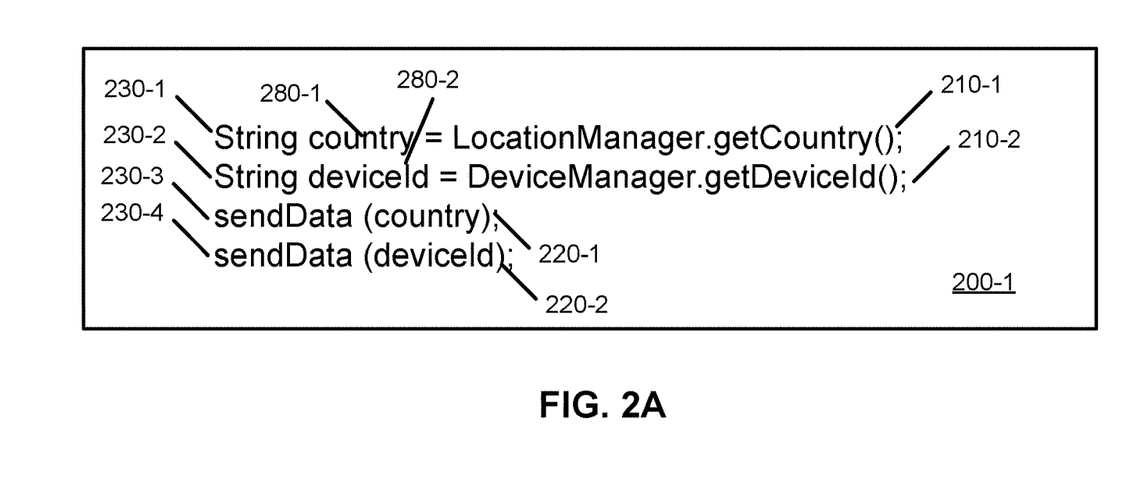
FIG. 2A is a code snippet used to illustrate why contextual information should be examined for sinks in an application.

To illustrate why the repair system should track contextual information such as the API for the source, consider an application that leaks the unique identifier of the device and the country code of the device; see FIG. 2A. This example uses "generic" representations of a "generic" operating system and is a code snippet 200-1 of a larger application 130. There are four code entries (e.g., lines of code) 230-1 through 230-4. There are two sources 210: source 210-1 of LocationManager.getCountry( ); and source 210-2 of DeviceManager.getDeviceId( ). Each of these is part of an API 160 for the OS 180. A specific example of the "generic" LocationManager in the Android operating system is the LocationManager class. A specific example of the "generic" DeviceManager in the Android operating system is the TelephonyManager class. Other similar classes can occur for other operating systems, such as Apple's iOS or Microsoft's Windows, both of which are operating systems for computer systems and registered trademarks by their respective companies.

The string "country" is set to a value returned from the first source 210-1, and the string "deviceID" is set to a value returned from the second source 210-2. The string county is a confidential or untrusted value 280-1 and the string deviceId is another confidential or untrusted value 280-2, each of which is confidential for the user, and it would be beneficial if these were not output by the application 130 in their complete form. A confidential or untrusted value is a sensitive value that has implications for the user. For instance, in the context of confidentiality, a sensitive value, referred to herein as a confidential value, is a value that if released would expose some unique information about the user or the user device 120, such as a device identification (ID), a location of the device, credit card information, the user's name or address, and the like. In the context of integrity, a sensitive value is an untrusted value that, if not verified, may compromise a system by influencing trusted computations. For example, a carefully crafted value entered by a user in a Web form may reach a database query written in Structured Query Language (SQL) and lead to unintended SQL commands, with catastrophic consequences, such as unauthorized modifications of database tables or the complete deletion of entire tables. This type of integrity attack is known as SWL injection. Similarly, a string value entered by a user in a blog, wiki, or social media Web site may contain malicious JavaScript code (which would be accepted by the server-side application as regular text). Once displayed on browser applications on the computers of other users, that text would actually be interpreted as code and instead of being simply rendered on the screen, it would be executed. This can cause the execution of arbitrary code on millions of computers worldwide, with catastrophic consequences as well. This type of integrity attack is known as Cross-site Scripting (XSS).

There are two sinks 220: a first sink 220-1 of sendData (country), which outputs a value corresponding to a country; and a second sink 220-2 of sendData (deviceId), which outputs a value corresponding to an ID of the device. The ID of the device is a unique device ID, for example, the IMEI (International Mobile Station Equipment Identity), or a unique ID built into or identifying a computer system.

To correctly prevent these data leaks, the tracking and repair system 140 cannot use an identical declassifier to obfuscate both confidential String objects (that is, both country and deviceId). This is because these confidential strings must conform to different formats, for example the string country must be a valid country name and the string deviceId must be a valid device identifier. A naive declassifier that simply replaces the confidential or untrusted data with the character "x", for example, can cause the corresponding API method to throw an exception, ultimately crashing the application and possibly rendering the application completely unusable. A declassifier is a method that obfuscates a value, e.g., by making a value to be publicly disclosed less specific and more general prior to public release so the original specific value is harder to determine or by modifying the value to a different value. For instance, a declassifier could take an address with a street address, city, and state and output only the city and state or only the state. Similarly, a declassifier could take a credit card value and replace each of the first 11 digits with an "X". As also described above, a declassifier could change a country code from the actual (original) country code to a different country code.

Figure 2B:
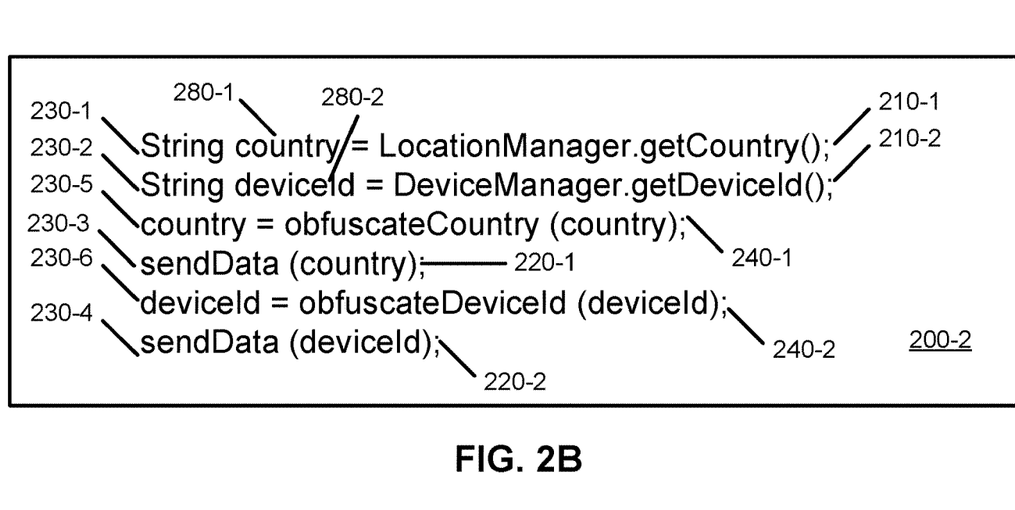
FIG. 2B is a code snippet used to illustrate use of different declassifiers, based on contextual information, before sinks in an application.

To correctly fix these data leaks, the tracking and repair system 140 instead uses designated obfuscateCountry( ) and obfuscateDeviceId( ) declassifiers. This is illustrated by FIG. 2B, which is a logical representation of how one might use different declassifiers 240-1 (obfuscateCountry) and 240-2 (obfuscateDeviceId). The obfuscateDeviceId( ) declassifier 240-2 can, for example, randomly generate an identifier that conforms to the International Mobile Station Equipment Identity (IMEI) standard. Similarly, the obfuscateCountry( ) declassifier 240-1 can randomly generate an identifier that conforms to a country code. Note that to correctly invoke the appropriate declassifier before the confidential data is leaked at the sink 220, the tracking and repair system 140 should, in this example, have access to contextual information. In particular, the tracking and repair system 140 should know at least the source API for each source 210.

As another example, consider the case of obfuscating encrypted confidential data. To correctly obfuscate the encrypted data, the tracking and repair system 140 may keep track of the cryptographic keys and algorithms used by the application 130. The tracking and repair system 140 can then first decrypt the confidential data, obfuscate the data using an appropriate declassifier, and finally encrypt the obfuscated data using the same cryptographic keys and initialization values.

While traditional dynamic taint analysis techniques can be used to detect when confidential data is released at a sink 220, they fail to provide sufficient contextual information which, as we have illustrated above, is critical to correctly prevent data leaks. The state-of-the-art dynamic taint analysis techniques typically provide a fixed number of taint tags, which is insufficient for encoding the contextual information needed to prevent the data leaks. As is known, a taint tag is used to track information from a source to a sink. The term "taint" in this context corresponds to confidential information. Even if one can dynamically track a large number of taint tags, dynamically tracking how these taint tags propagate through the application does not scale in practice. This is because to represent a larger number of taint tags the tracking and repair system 140 must use more taint bits, which significantly increases the runtime overhead of the system.

By contrast, there are proposed herein techniques for dynamically tracking the context of mobile applications. The proposed techniques have features in exemplary embodiments that set these techniques apart from the state-of-the-art techniques used for preventing confidential data leaks:

(1) The techniques can be extended to track additional context and therefore can be tailored to prevent different classes of confidentiality data leaks, and (2) The techniques track the application's context efficiently, using only one taint bit at runtime, and the performance scales in the amount of tracked contextual information.

Context may include source and sink information plus any other information required for proper obfuscation. Feature (1) makes the techniques very flexible: one can adapt the system not only to track additional contextual information, if this is needed to prevent certain data leaks, but also to stop tracking (e.g., unnecessary) contextual information in order to improve the performance of the system. Feature (2) makes our techniques light-weight and scalable. In this document, we detail the proposed techniques.

Confidentiality data leaks are prevented in an automated manner. In broad terms, this can be performed by the following:

(A) Tracking the data (e.g., the confidential or untrusted values 280) that the application 130 releases at security sinks 220;

(B) Checking whether the confidential or untrusted values 280 released at the sinks 220 are confidential; and (C) Obfuscating the confidential or untrusted values 280 before the confidential or untrusted values 280 are released to unauthorized entities 110.

Additionally, the proposed techniques for light-weight context tracking may in exemplary embodiments include (1) defining the contextual information that is required for correctly repairing vulnerabilities, (2) tracking the context as the application executes, and (3) fetching the necessary contextual information when a vulnerability is repaired. In the following, we detail these three steps.

Step 1, Defining Context. To use an exemplary light-weight context tracking technique, the contextual information is defined that is needed to correctly prevent the confidentiality data leaks. This definition is typically done by the security administrator. For example, to track the source APIs used to obtain confidential or untrusted values, one can configure the system to map each confidential or untrusted value (confidential or untrusted values 280) to the signature of the source API. In this context, the signature of the source API is a unique identifier to a method or field of that source API. For instance, an API such as TelephonyManager from the Android OS may have multiple different methods or fields that can be a problem from a confidentiality or integrity standpoint, and it can be important to distinguish between these methods and fields.

Step 2, Tracking Context: To track an application's context, the proposed techniques maintain a map 155 (see FIG. 1) from confidential data to context data. The context data is a data structure that stores any contextual information defined in step (1) and is illustrated in FIG. 1 as the defined context 145.

Step 3, Fetching Context. To fetch contextual information, the system queries the context data associated to the confidential value.

Figure 3A:
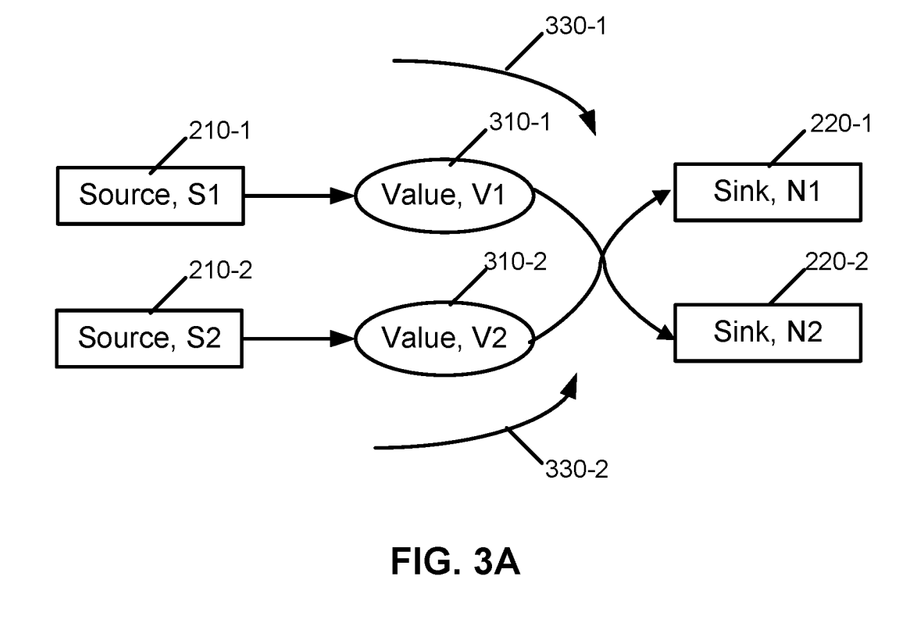
Figure 3B:
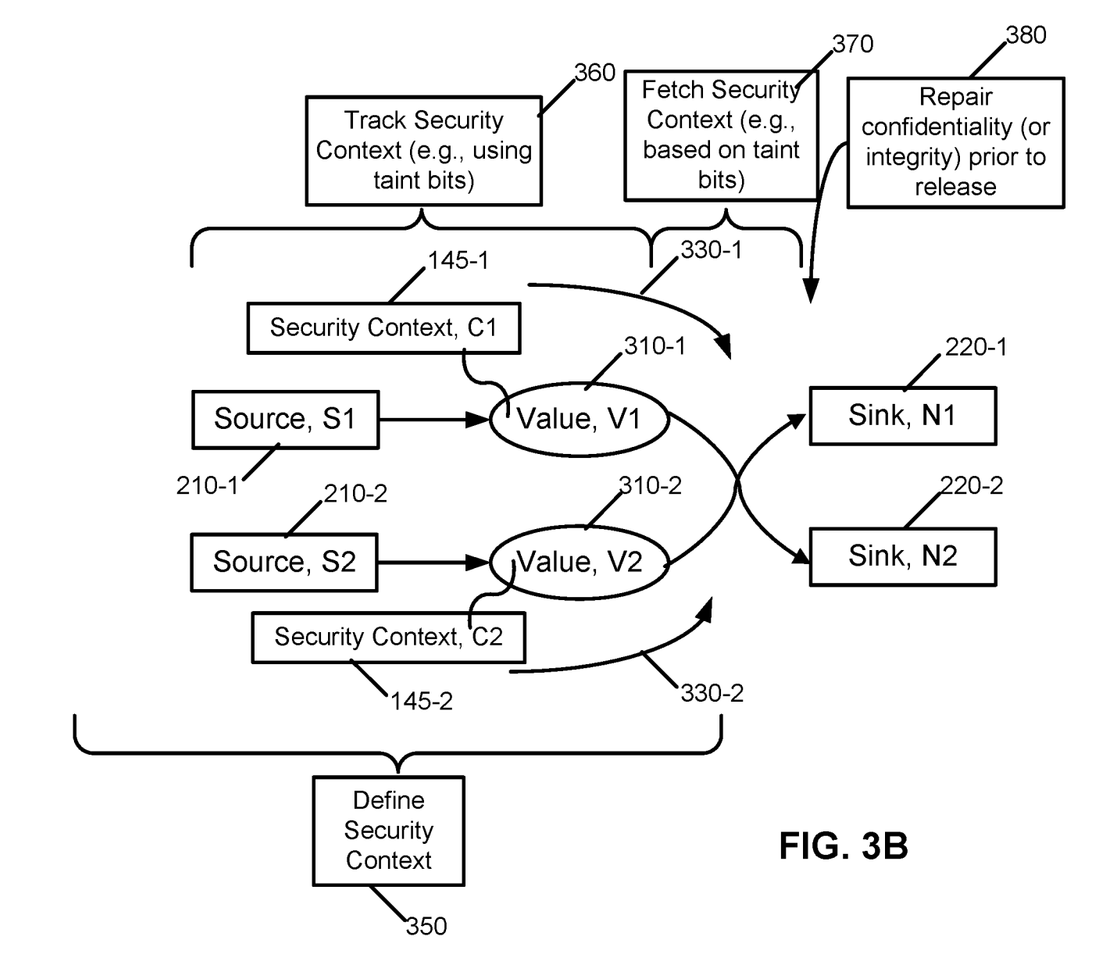
FIG. 3B illustrates efficient one-bit dynamic taint analysis and dynamic tracking of taint and its context in exemplary embodiments.

The figures in FIG. 3A and FIG. 3B provide intuitive views to illustrate an exemplary technique. In FIG. 3A, a traditional dynamic taint analysis tracking is illustrated, where solid arrows denote dynamic taint tracking via corresponding flows 330. In this example, there are two sources of taint, sources S1 210-1 and S2 210-2, which flow via corresponding flows 330-1 and 330-2 to confidential or untrusted values V1 310-1 and V2 310-2 to corresponding sinks N2 220-2 and N1 220-1, respectively.

FIG. 3B illustrates how a technique in accordance with an exemplary embodiment keeps track of the contextual information associated to confidential or untrusted values. The Step 1 above is illustrated by the define security context block 350, which is illustrated as occurring prior to execution and during execution of the application 130. As the application 130 executes, the tracking and repair system 140 updates context data (in security context C1 145-1 and C2 145-2) associated to each value 310-1 and 310-2. This is illustrated in part by block 360, where security context is tracked (e.g., using taint bits, one bit per value 310). Block 360 corresponds to Step 2 (Tracking Context) above. Step 3 (Fetching Context) is illustrated by block 370, where security context 145 is fetched (e.g., based on taint bits). In block 380, the confidentiality or integrity is repaired prior to release of the value V1 310-1 or V2 310-2 by the corresponding sink N2 220-2 or N1 220-1, respectively. It is at this location that an appropriate declassifier (not shown in FIG. 3B) would be executed on a corresponding value 310. Note that the term "taint" here is used for both integrity (where a value is considered to be tainted—that is, has untrusted information—by data from outside the application) and confidentiality (where a value is trustworthy but if released will release information confidential to a user).

Figure 4:
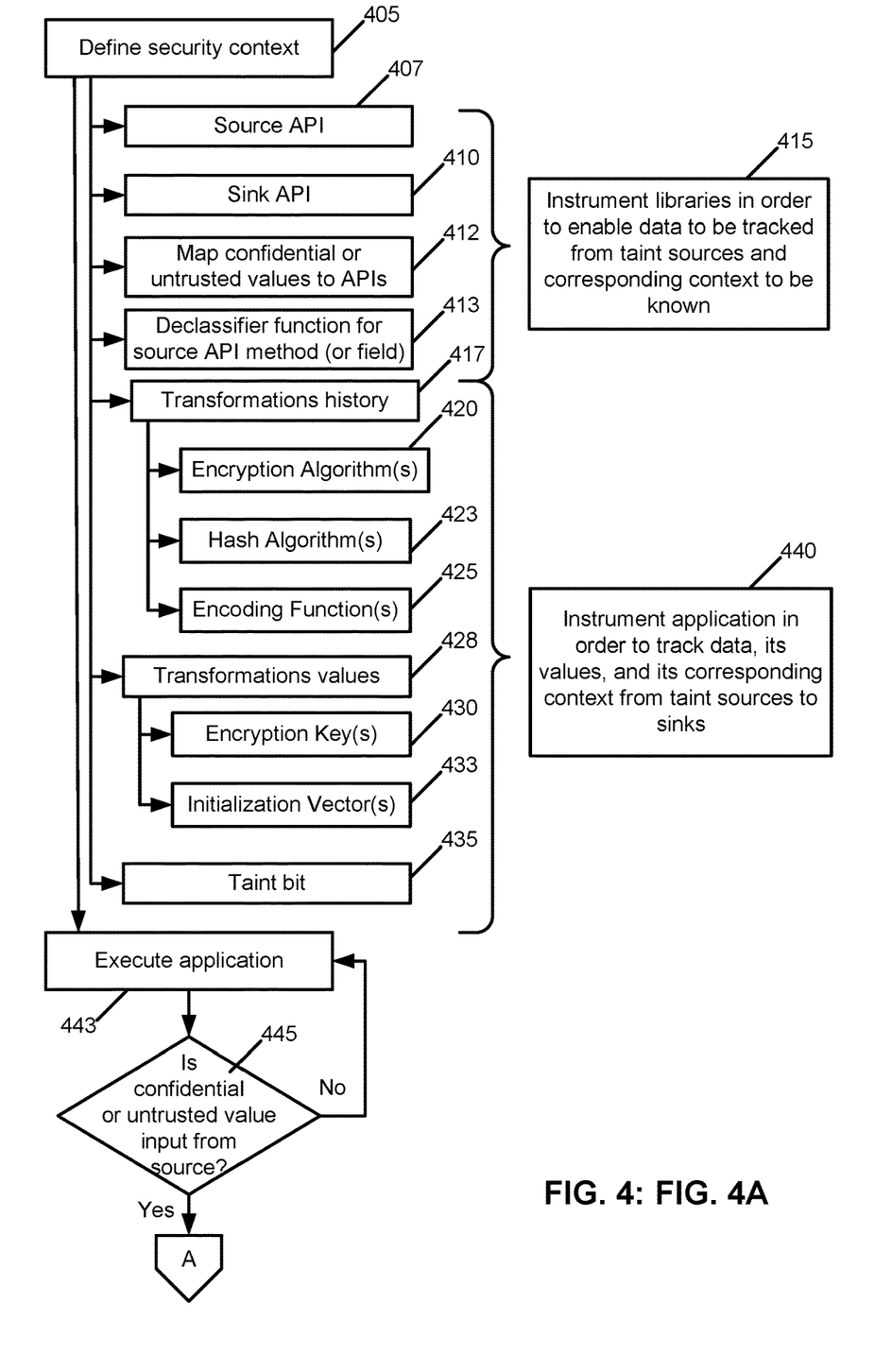

Turning to FIG. 4, which includes FIGS. 4A and 4B, this figure is a logic flow diagram for light-weight context tracking and repair. This figure illustrates the operation of an exemplary method, a result of execution of computer program instructions embodied on a computer readable memory, functions performed by logic implemented in hardware, and/or interconnected means for performing functions in accordance with exemplary embodiments.

In block 405, the security context 145 is defined. This typically occurs prior to execution of the application 130 but may also in part occur after execution of the application 130. In the example of FIG. 4A, the security context 145 and its definition in block 405 includes one or more of the following data and their definitions as context 145: the source API 407 (e.g., as a unique identification of the source method or field); the sink API 410 (e.g., as a unique identification of the source method or field); the map (e.g., as part of map 155) of confidential or untrusted values to APIs 412; the declassifier function 413 (e.g., declassifiers 240-1 or 240-2) to use for a source API method; transformations history 417; transformations values 428; and a taint bit 435. Note that there would be one taint bit per confidential or untrusted value. As indicated above, the transformations history 417 may include (as appropriate for the particular value 310) indication(s) of encryption algorithms 420, hash algorithms 423, and encoding functions 425. As also indicated above, the transformation values 428 may include (as appropriate for the particular value 310) indications of encryption keys 430 and initialization vectors 433. Note that the map 155 may also include any of the security context defined in block 405. Also, the elements of security context could depend on the confidential or untrusted value 310. For instance, values unrelated to encryption, hashing, or encoding may not have corresponding elements 417 and 428.

In order to provide this context tracking, it is possible for the libraries 165 of the API(s) 160 to be instrumented in block 415. That is, in block 415, the libraries 165 are instrumented in order to enable data to be tracked from taint sources and corresponding context to be known. The libraries 165 may be instrumented by the creator of the libraries 165 or by another entity, e.g., making the tracking and repair system 140. The instrumentation performs data tracking so, at the point in which a piece of data reaches a sink, it is possible to tell where the data comes from and whether the data is confidential or untrusted (e.g., tainted), and the necessary declassification (for confidential data) or validation (for untrusted data) can be applied. Block 415 corresponds to blocks 407, 410, and 412 as examples of what context can be tracked based on instrumenting the libraries 165.

Additionally, it is possible for the application 130 to be instrumented in block 440. That is, in block 440, the application 130 is instrumented in order to track data, its values, and its corresponding context from taint sources to sinks. Block 440 corresponds to blocks 417, 428, and 435 as examples of what context can be tracked based on instrumenting the application 130.

In block 443, the user device 120 executes the application. Blocks 445 to 490 are performed by the user device 120, e.g., under control at least in part by the tracking and repair system 140. In block 445, the user device 120 determines if a confidential or untrusted value 310 is input from a source 210. That is, block 445 determines whether a confidential or untrusted value 310 is set to a value of data from a source 210. If not (block 445=No), the flow proceeds to block 443. If so (block 445=Yes), the user device 120 sets a taint bit to the value TAINTED (e.g., zero or one) in block 450. The user device 120 in block 455 tracks the confidential or untrusted value 310 on its path toward a sink 220. Block 455 can include (block 460) tracking security context, including modifying transformations history, transformations values and the taint bit 435 if necessary.

In block 465, the user device 120 determines whether a sink 220 is reached by the confidential or untrusted value 310. If not (block 465=No), the flow 330 of the confidential or untrusted value 310 is continued to be tracked in block 455. If a sink has been reached (block 465=Yes), the user device 120 determines (block 467) whether the taint bit is still set to TAINTED. If not (block 467=No), the user device 120 releases the confidential or untrusted value 130 to the sink 220 in block 470.

If the taint bit is set to TAINTED (block 467=Yes), the user device 120 fetches the security context 145 for the confidential or untrusted value 130 in block 475. In block 485, the user device 120 obfuscates the confidential or untrusted value based on the security context. For instance, as described previously, the security context 405 can be used to determine the appropriate declassifier function (such as obfuscateCountry( ) or obfuscateDeviceId( )) and the tracking and repair system 140 then causes the declassifier function to be used appropriately.

In a more complex example, the transformation history 417 and transformations values 428 may be used to keep track of the cryptographic keys and algorithms used by the application 130. The tracking and repair system 140 can then first decrypt the confidential data, obfuscate the data using an appropriate declassifier, and finally encrypt the obfuscated data using the same cryptographic keys and initialization values. In order to enable this functionality, the decryption algorithm or other algorithms (or a sequence of steps to take the value from its current state to one where the value can be obfuscated) should be provided, such as in the security context 145. There may also be a choice of various algorithms. As long as the encryption and decryption phases are performed with the same algorithm and matching keys, these techniques will work. In block 490, the user device 120 releases the obfuscated confidential or untrusted value 240 to the sink 220.

Note that blocks 445-490 are assumed to be performed by the user device 120 and the tracking and repair system 140 in real-time, without modifying or instrumenting the application 130. That is, these blocks are separate from the functions of the application 130, but the application 130 is instrumented to allow the context and values to be tracked.

It is noted that the map 155 from the confidential or untrusted values 310 to the security context 145 may be used at multiple locations in the process of FIG. 4. For instance, the map 155 may be used in some or all of blocks 450, 455, 460, 465, 467, 475, and 485.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    tracking, by a computer system, security context for confidential or untrusted values input from sources in an executing application to sinks in the executing application, wherein the security context comprises at least indications of sources and declassifier methods corresponding to the confidential or untrusted values and has been previously defined prior to the tracking, wherein the security context further comprises the following: one or more indications of a sequence of transformations applied to corresponding confidential or untrusted values, and one or more transformation values used when transforming the confidential or untrusted values;
    fetching, by the computer system and prior to release of a selected confidential or untrusted value by a sink in the executing application, security context for the selected confidential or untrusted value;
    causing by the computer system a selected declassifier method to be used on the selected confidential or untrusted value prior to release of the selected confidential or untrusted value to the sink, wherein the selected declassifier method obfuscated the selected confidential or untrusted value and is selected based on the security context for the selected confidential or untrusted value, wherein causing the selected declassifier method to be used further comprises:
        using the one or more indications of the sequence of transformations and the one or more transformation values to take the selected confidential or untrusted value from a first state to a second, different state;
        causing the selected declassifier method to be used on the selected confidential or untrusted value in the second state to create a declassified value; and
        using the sequence of transformations and the one or more transformation values to take the declassified value from the second state back to the first state; and
    causing by the computer system the obfuscated confidential or untrusted value to be released to the sink in the executing application, wherein causing the obfuscated confidential or untrusted value to be released to the sink in the executing application further comprises causing the declassified value in the first state to be released to the sink in the executing application.

2. The method of claim 1, wherein the computer system comprises a wireless, mobile device.

3. The method of claim 1, wherein:
tracking further comprises setting a taint bit corresponding to the selected confidential or untrusted value in response to the selected confidential or untrusted value receiving information from a source in the executing application; and
fetching further comprises fetching security context for the selected confidential or untrusted value in response to the corresponding taint bit still being set for the confidential or untrusted value prior to the confidential or untrusted value being released to the sink.

4. The method of claim 1, wherein:
the sequence of transformations comprises one or more of a transformation by an encryption algorithm, a transformation by a hash algorithm, or a transformation by an encoding function; and
the one or more transformation values comprise one or more of the following: one or more encryption keys; or one or more initialization vectors.

5. The method of claim 1, wherein the security context comprises indications of unique application programming interface methods as the sources, fields as the sources, or both unique application programming interface methods and fields as the sources.

6. The method of claim 1, wherein the selected declassifier method repairs one of confidentiality or integrity of the selected value prior to release of the selected value.

7. The method of claim 1, wherein the sources correspond to methods in one or more application programming interfaces, and the one or more application programming interfaces are instrumented to allow for the tracking of the security context for the confidential or untrusted values.

8. A computer system, comprising:
memory storing computer-readable code; and
one or more processors, wherein the one or more processors cause the computer system, in response to retrieval and execution of the computer-readable code, to perform operations comprising:
tracking, by the computer system, security context for confidential or untrusted values input from sources in an executing application to sinks in the executing application, wherein the security context comprises at least indications of sources and declassifier methods corresponding to the confidential or untrusted values and has been previously defined prior to the tracking, wherein the security context further comprises the following: one or more indications of a sequence of transformations applied to corresponding confidential or untrusted values, and one or more transformation values used when transforming the confidential or untrusted values;
fetching, by the computer system and prior to release of a selected confidential or untrusted value by a sink in the executing application, security context for the selected confidential or untrusted value;
causing by the computer system a selected declassifier method to be used on the selected confidential or untrusted value prior to release of the selected confidential or untrusted value to the sink, wherein the selected declassifier method obfuscated the selected confidential or untrusted value and is selected based on the security context for the selected confidential or untrusted value, wherein causing the selected declassifier method to be used further comprises:
using the one or more indications of the sequence of transformations and the one or more transformation values to take the selected confidential or untrusted value from a first state to a second, different state;
causing the selected declassifier method to be used on the selected confidential or untrusted value in the second state to create a declassified value; and
using the sequence of transformations and the one or more transformation values to take the declassified value from the second state back to the first state; and
causing by the computer system the obfuscated confidential or untrusted value to be released to the sink in the executing application, wherein causing the obfuscated confidential or untrusted value to be released to the sink in the executing application further comprises causing the declassified value in the first state to be released to the sink in the executing application.

9. The computer system of claim 8, wherein the computer system comprises a wireless, mobile device.

10. The computer system of claim 8, wherein:
tracking further comprises setting a taint bit corresponding to the selected confidential or untrusted value in response to the selected confidential or untrusted value receiving information from a source in the executing application; and
fetching further comprises fetching security context for the selected confidential or untrusted value in response to the corresponding taint bit still being set for the confidential or untrusted value prior to the confidential or untrusted value being released to the sink.

11. The computer system of claim 8, wherein:
the sequence of transformations comprises one or more of a transformation by an encryption algorithm, a transformation by a hash algorithm, or a transformation by an encoding function; and
the one or more transformation values comprise one or more of the following: one or more encryption keys; or one or more initialization vectors.

12. The computer system of claim 8, wherein the security context comprises indications of unique application programming interface computer systems as the sources, fields as the sources, or both unique application programming interface computer systems and fields as the sources.

13. The computer system of claim 8, wherein the selected declassifier computer system repairs one of confidentiality or integrity of the selected value prior to release of the selected value.

14. The computer system of claim 8, wherein the application is instrumented to allow for the tracking of the security context for the confidential or untrusted values.

15. The computer system of claim 8, wherein the sources correspond to computer systems in one or more application programming interfaces, and the one or more application programming interfaces are instrumented to allow for the tracking of the security context for the confidential or untrusted values.

16. A computer program product comprising a computer readable storage medium having program instructions embodied therewith, the program instructions executable by a computer system to cause the computer system to perform operations comprising:
tracking, by the computer system, security context for confidential or untrusted values input from sources in an executing application to sinks in the executing application, wherein the security context comprises at least indications of sources and declassifier methods corresponding to the confidential or untrusted values and has been previously defined prior to the tracking, wherein the security context further comprises the following: one or more indications of a sequence of transformations applied to corresponding confidential or untrusted values, and one or more transformation values used when transforming the confidential or untrusted values;

fetching, by the computer system and prior to release of a selected confidential or untrusted value by a sink in the executing application, security context for the selected confidential or untrusted value;

causing by the computer system a selected declassifier method to be used on the selected confidential or untrusted value prior to release of the selected confidential or untrusted value to the sink, wherein the selected declassifier method obfuscated the selected confidential or untrusted value and is selected based on the security context for the selected confidential or untrusted value, wherein causing the selected declassifier method to be used further comprises:

using the one or more indications of the sequence of transformations and the one or more transformation values to take the selected confidential or untrusted value from a first state to a second, different state;

causing the selected declassifier method to be used on the selected confidential or untrusted value in the second state to create a declassified value; and using the sequence of transformations and the one or more transformation values to take the declassified value from the second state back to the first state; and causing by the computer system the obfuscated confidential or unfrosted value to be released to the sink in the executing application, wherein causing the obfuscated confidential or untrusted value to be released to the sink in the executing application further comprises causing the declassified value in the first state to be released to the sink in the executing application.

17. The method of claim 1, wherein the selected declassifier method obfuscated the selected confidential or unfrosted value by modifying the selected confidential or untrusted value from a first value that is known to be valid for the sink and in a format known to be used by the sink to a different value that is known to be valid for the sink and in a format known to be used by the sink.

18. The method of claim 1, wherein:

the method further comprises, prior to the fetching, determining by the computer system whether to release a selected confidential or untrusted value to a sink in the executing application or to fetch security context for the selected confidential or untrusted value;

releasing the selected confidential or untrusted value to the sink in response to a determination to release the selected confidential or untrusted value;

performing the following in response to a determination to fetch the security context: the fetching the security context, the causing the selected declassifier method to be used on the selected confidential or untrusted value prior to release of the selected confidential or untrusted value to the sink, and the causing the obfuscated confidential or untrusted value to be released to the sink in the executing application.

19. The computer program product of claim 16, wherein the computer system comprises a wireless, mobile device.

* * * * *